(Model.)
A. P. FREDERICK.
CHURN.
No. 249,515.　　　　　Patented Nov. 15, 1881.
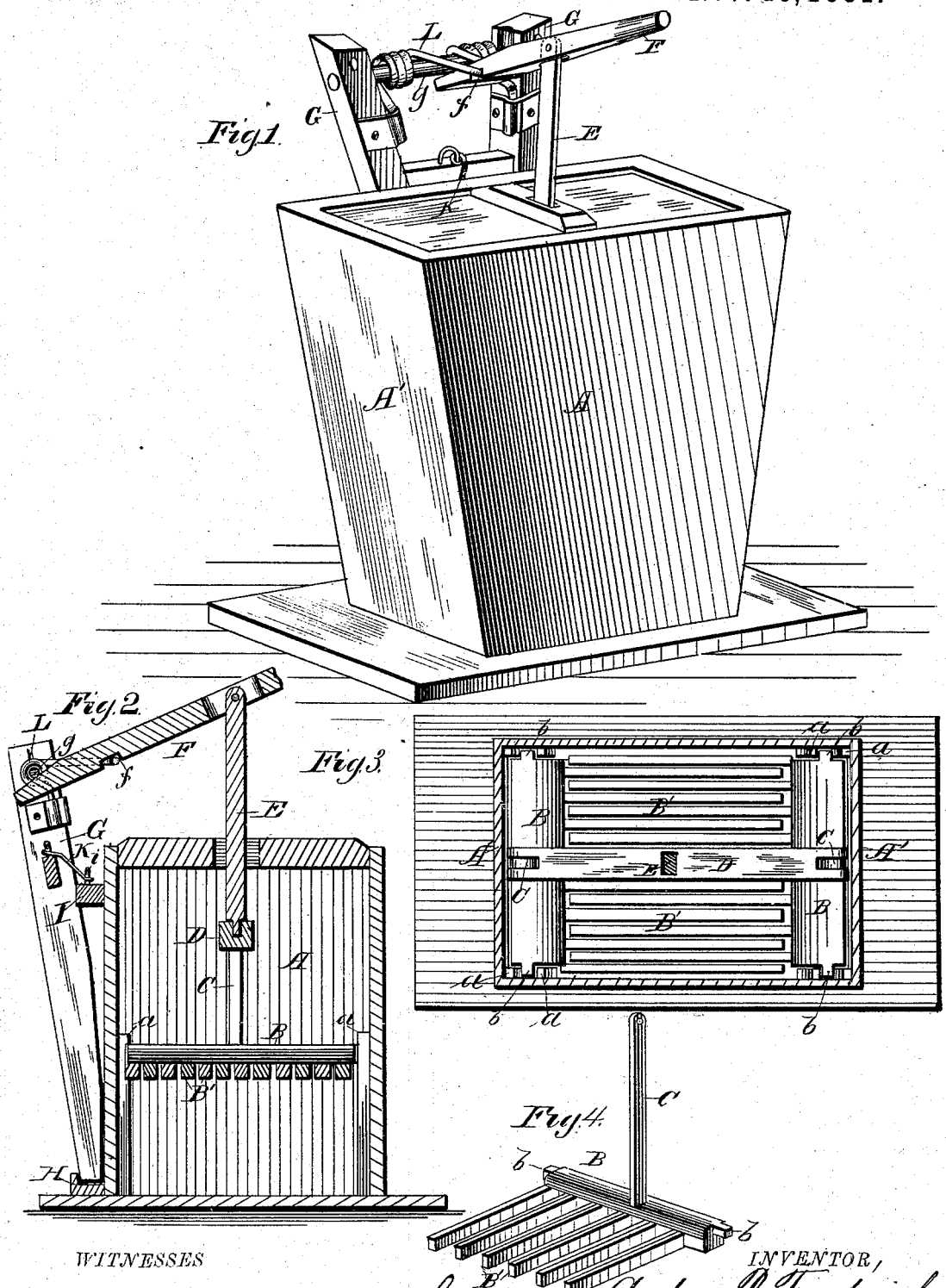
WITNESSES　　　　　　　　　　　　　INVENTOR,
Fred. G. Dieterich.　　　　　　　　　Andrew P. Frederick
Wall P. Onohundro.　By his Attorneys, Louis Bagger & Co.

UNITED STATES PATENT OFFICE.

ANDREW P. FREDERICK, OF MASON, MICHIGAN.

CHURN.

SPECIFICATION forming part of Letters Patent No. 249,515, dated November 15, 1881.

Application filed May 23, 1881. (Model.)

*To all whom it may concern:*

Be it known that I, ANDREW P. FREDERICK, of Mason, in the county of Ingham and State of Michigan, have invented certain new and useful Improvements in Churns; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view. Fig. 2 is a longitudinal vertical section. Fig. 3 is a horizontal section through the lower part of the churn; and Fig. 4 is a perspective view of one of the pair of dashers.

Similar letters of reference indicate corresponding parts in all the figures.

My invention has relation to upright churns with reciprocating dashers; and it consists in an improved construction and combination of parts, as hereinafter more fully set forth, and particularly pointed out in the claim.

In the annexed drawings, A represents the churn-body or cream-receptacle, the sides A' of which slant or taper in a downward direction, so as to make the width of the churn gradually decrease from top to bottom.

Secured upon the inside of the parallel front and back pieces are strips or cleats $a\ a$, which form ways for the dashers B, each of which has a projection, $b$, which fits into the ways formed between the strips $a$, so as to guide the dashers in their upward and downward movement.

Two dashers or agitators are employed in this churn, each one of which is composed of a body, B, having a series of projecting fingers, B', so arranged that the fingers of one will project into the interstices between the fingers of the dasher opposite. Each dasher is secured to the lower end of a rod or bar, C, which said rods are pivoted at opposite ends of a cross-piece, D, that is attached rigidly by its middle to the lower end of the dasher-staff E, which projects up through a slot in the cover and is hinged in a lever, F.

The inner end of lever F is inserted under and bears against a cross-bar, $g$, which connects the upper diverging ends of two uprights, G G, the united lower ends of which are stepped into a mortised block, H, on the churn bottom.

I is a piece of plank, which is secured upon one of the straight sides of the churn and has an eye or staple, $i$, which receives the hook K, by means of which the uprights G are held in place detachably.

L is a bent spring, the ends of which are secured in the upper parts of the uprights G and coiled around the upper cross-bar, $g$, as shown in Fig. 1, and lever F has a slot or mortise, $f$, in its under side, which receives the projecting bent part of spring L. It follows that the tension of the spring in its described combination with the lever operates to throw the latter in an upward direction. In depressing the outer end of the lever against the tension of the spring the dashers are forced in a downward direction toward the bottom of the churn, bearing against the inclined sides, which cause them to approach one another on the downward stroke, and again diverge as the lever is carried upward by the spring. In this manner the cream is thoroughly stirred, causing the butter to come quick, while the labor of churning is greatly facilitated by the operation of the spring L in the manner described.

I claim and desire to secure by Letters Patent of the United States—

The combination of the churn A, having inclined sides A', mortised block H, and cleat or bracket I, provided with the staple $i$, frame G G, having cross-bar $g$, spring L, and hook K, lever F, mortised at $f$, and dasher-staff E, having cross-bar D, and hinged dashers C B B' C B B', all constructed and combined to operate substantially in the manner and for the purpose herein shown and specified.

In testimony that I claim the foregoing as my own I have hereunto affixed my signature in presence of two witnesses.

ANDREW P. FREDERICK.

Witnesses:
JOHN C. CANNON,
ADELBERT O. DU BOIS.